United States Patent
Riha et al.

(10) Patent No.: US 11,679,459 B2
(45) Date of Patent: *Jun. 20, 2023

(54) REUSABLE AND ADJUSTABLE UNIVERSAL FIXTURING SYSTEM FOR ASSEMBLY AND CHECK FIXTURES

(71) Applicant: Ford Motor Company, Dearborn, MI (US)

(72) Inventors: Erik Riha, Dearborn, MI (US); Michael Dean Blodgett, Holland, OH (US); Dennis Cedar, West Bloomfield, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/551,226

(22) Filed: Dec. 15, 2021

(65) Prior Publication Data

US 2023/0073392 A1 Mar. 9, 2023

Related U.S. Application Data

(63) Continuation-in-part of application No. 17/468,715, filed on Sep. 8, 2021, which is a continuation of application No. 16/223,929, filed on Dec. 18, 2018, now Pat. No. 11,123,833.

(51) Int. Cl.
*B23Q 1/03* (2006.01)
*B23Q 3/18* (2006.01)
*B23Q 17/22* (2006.01)

(52) U.S. Cl.
CPC .......... *B23Q 1/032* (2013.01); *B23Q 1/037* (2013.01); *B23Q 3/18* (2013.01); *B23Q 17/2216* (2013.01)

(58) Field of Classification Search
CPC .............. B23Q 17/22; B23Q 17/2225; B23Q 17/2216; B23Q 17/2291; B23Q 16/00; B23Q 16/02; B23Q 16/06; B23Q 16/08; B23Q 16/10; B23Q 1/032; B23Q 1/037; B23Q 1/25; B23Q 1/42; B23Q 1/46; B23Q 1/48; B23Q 1/62; B23Q 1/66; B23Q 3/18;

(Continued)

(56) References Cited

U.S. PATENT DOCUMENTS

| 5,305,992 | A | * | 4/1994 | Kish | ............... | B23Q 1/035 |
| | | | | | | 269/274 |
| 8,998,191 | B2 | * | 4/2015 | Gao | ............... | B62D 65/026 |
| | | | | | | 269/311 |

* cited by examiner

*Primary Examiner* — Monica S Carter
*Assistant Examiner* — Alberto Saenz
(74) *Attorney, Agent, or Firm* — Burris Law, PLLC

(57) ABSTRACT

A locating fixture that includes a base, an adjustable locating member, a plurality of indicia, a restraining member and a lower substructure. The base includes a raised platform having a mounting aperture. The adjustable locating member is disposed within the mounting aperture and includes a part locating feature and a position indicator fixedly attached to the adjustable locating member. The plurality of indicia is located on the raised platform adjacent to the adjustable locating member. The position indicator cooperates with the plurality of indicia to determine a vertical position of the adjustable locating member. The restraining member is cooperatively engaged with the adjustable locating member. The lower substructure is configured to allow for longitudinal and lateral translation of the base. The base is translatably mounted to the lower substructure.

20 Claims, 11 Drawing Sheets

(58) Field of Classification Search
CPC ........ B23Q 3/106; B23Q 3/107; B23Q 7/005;
B23Q 2220/004; B23Q 2716/08
USPC .............................................. 269/289 r, 309
See application file for complete search history.

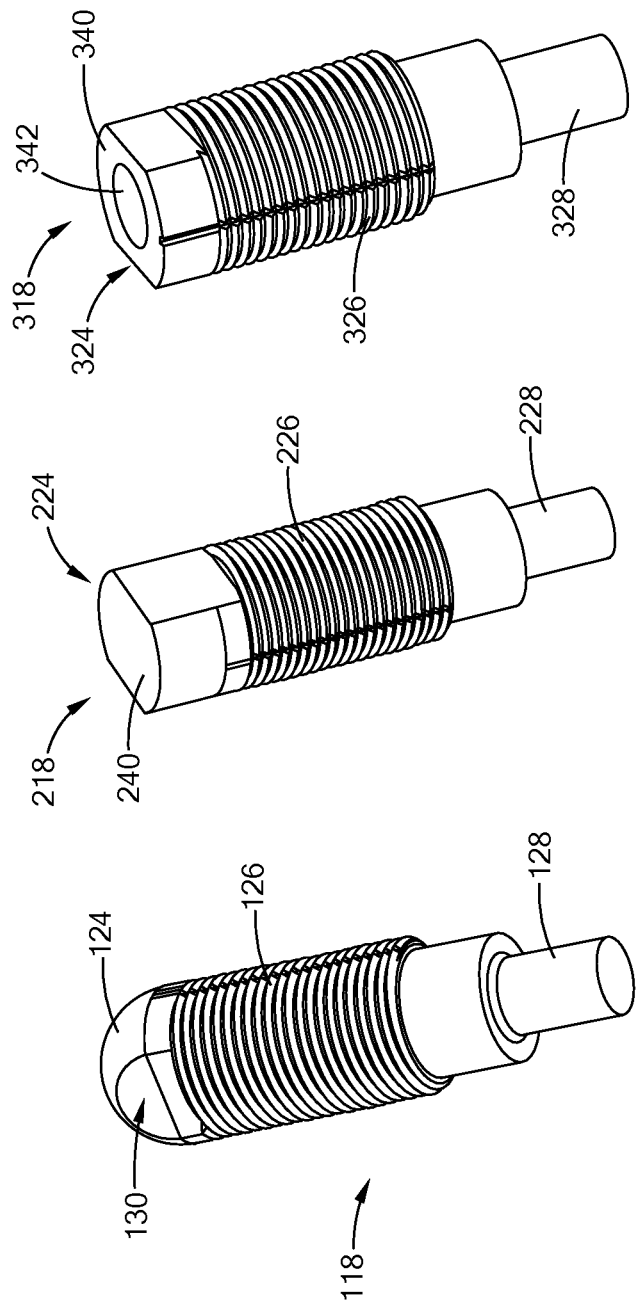

REUSABLE AND ADJUSTABLE UNIVERSAL FIXTURING SYSTEM FOR ASSEMBLY AND CHECK FIXTURES

CROSS-REFERENCE TO RELATED APPLICATION

This application is a continuation-in-part of and claims the benefit of U.S. application Ser. No. 17/468,715, filed Sep. 8, 2021, which is a continuation of and claims the benefit of U.S. application Ser. No. 16/223,929, filed Dec. 18, 2018, and titled "ADJUSTABLE FIXTURE TO POSITION PARTS FOR DIMENSIONAL MEASUREMENT," the contents of which are incorporated herein by reference in its entirety.

FIELD

The present disclosure relates to a part locating fixture, or a check fixture/tool, and a method of locating and restraining a part for dimensional verification.

BACKGROUND

The statements in this section merely provide background information related to the present disclosure and may not constitute prior art.

Automobile body panels are typically manufactured utilizing a stamping process. These body panels have dimensional requirements, which are typically defined on a part print, to meet quality standards. The dimensional requirements may include profile, location of specific features on the body panels relative to a datum, and thickness(es), among others. Dimensions of the body panels are verified using check fixtures, which locate the body panels relative to datums, and dimensional measurement equipment such as a coordinate measurement machine (CMM) measures the key dimensions. Over time and with the variety of the parts being check, check, fixtures need to be shimmed to bring them back into tolerance and to accommodate different part numbers, which involves costly manual labor. Further, check fixtures need to be shimmed multiple times, thus adding to overall costs and downtime.

The present disclosure addresses issues related to the adjustment of locating fixtures that constrain parts during dimensional measurement.

SUMMARY

Generally, the present disclosure provides a locating fixture having an innovative adjustable locating member with a part locating feature and position indicator to position a part for subsequent measurement/verification.

In one form, the present disclosure provides a locating fixture comprising a base, an adjustable locating member, a plurality of indicia, a restraining member, and a lower substructure. The base includes a raised platform having a mounting aperture. The adjustable locating member is disposed within the mounting aperture and includes a part locating feature and a position indicator fixedly attached to the adjustable locating member. The plurality of indicia is located on the raised platform adjacent to the adjustable locating member. The position indicator cooperates with the plurality of indicia to determine a vertical position of the adjustable locating member. The restraining member is cooperatively engaged with the adjustable locating member. The lower substructure is configured to allow for longitudinal and lateral translation of the base. The base is translatably mounted to the lower substructure.

In variations of the locating fixture, which may be implemented individually or in any combination: the lower substructure comprises an upper plate slidably engaged with a lower plate, the upper plate comprising a set of rails and the base being translatably mounted between the set of rails; the lower plate comprises a protrusion and the upper plate comprises a cutout slidably engaged about the protrusion; the lower plate comprises a set of rails and the upper plate is translatably mounted to the lower plate between the set of rails of the lower plate; a base displacement member is secured to the upper plate and operable to engage a lower portion of the base to translate the base between the set of rails of the upper member; the base displacement member is a threaded screw; an upper plate displacement member is secured to the lower plate and operable to engage the upper plate to translate the upper plate; the upper plate displacement member is a threaded screw; at least one of the base, the raised platform, the adjustable locating member, and the lower substructure are manufactured with an additive manufacturing process; the adjustable locating member is a polymeric material and at least an upper portion of the adjustable locating member comprises a coating; the coating comprises a Ni layer and a Cu layer; a base position indicator is fixed to the base and at least one scale is between the base and an upper plate of the lower substructure, and the base position indicator cooperates with the at least one scale to indicate a translational position of the base relative to the upper plate; the lower substructure comprises an upper plate slidably engaged with a lower plate, a plate position indicator is fixed to one of the upper plate and the lower plate, and at least one scale is between the lower plate and the upper plate, the plate position indicator cooperates with the at least one scale to indicate a translational position of the upper plate relative to the lower plate; an upper portion of the adjustable locating member comprises a domed shape; an upper portion of the adjustable locating member comprises a central aperture configured to receive a locator pin; an upper portion of the adjustable locating member comprises a flat top; an upper portion of the adjustable locating member comprises a tool removal feature.

In another form, the present disclosure provides a locating fixture comprising a base, an adjustable locating member, a plurality of indicia, a restraining member, and a lower substructure. The base includes a raised platform having a mounting aperture. The adjustable locating member is disposed within the mounting aperture and includes a part locating feature and a position indicator fixedly attached to the adjustable locating member. The plurality of indicia is located on the raised platform adjacent to the adjustable locating member. The position indicator cooperates with the plurality of indicia to determine a vertical position of the adjustable locating member. The restraining member is cooperatively engaged with the adjustable locating member. The lower substructure is configured to allow for longitudinal and lateral translation of the base. The base is translatably mounted to the lower substructure and at least one of the base, the raised platform, the adjustable locating member, and the lower substructure are manufactured with an additive manufacturing process.

In one variation of the locating fixture of the above paragraph, the lower substructure comprises an upper plate slidably engaged with a lower plate. The upper plate comprises a set of rails and the base being translatably mounted between the set of rails.

In yet another form, the present disclosure provides a locating fixture comprising a base, an adjustable locating member, a plurality of indicia, and a lower substructure. The base includes a raised platform having a mounting aperture. The adjustable locating member is disposed within the mounting aperture and includes a part locating feature and a position indicator fixedly attached to the adjustable locating member. The plurality of indicia is located on the raised platform adjacent to the adjustable locating member. The position indicator cooperates with the plurality of indicia to determine a vertical position of the adjustable locating member. The lower substructure is configured to allow for longitudinal and lateral translation of the base. The lower substructure comprises an upper plate slidably engaged with a lower plate. The upper plate comprises a set of rails and the base being translatably mounted between the set of rails. The base is translatably mounted to the lower substructure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figures 4A, 4B, 4C:
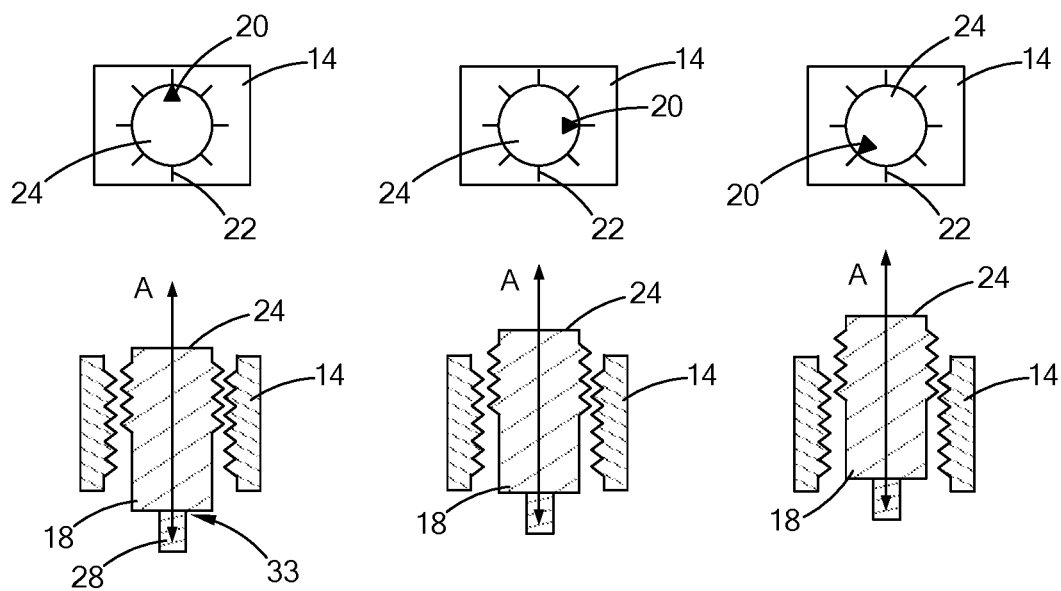
Figure 5:
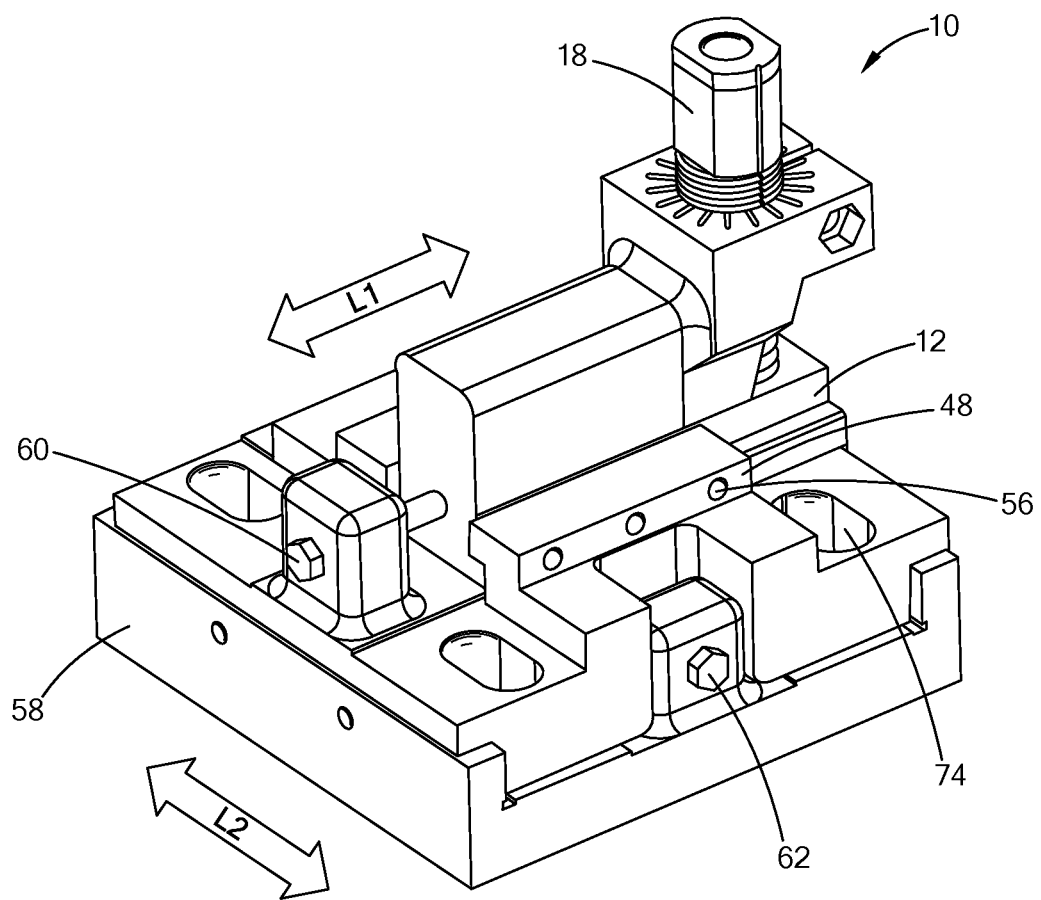
Figure 6:
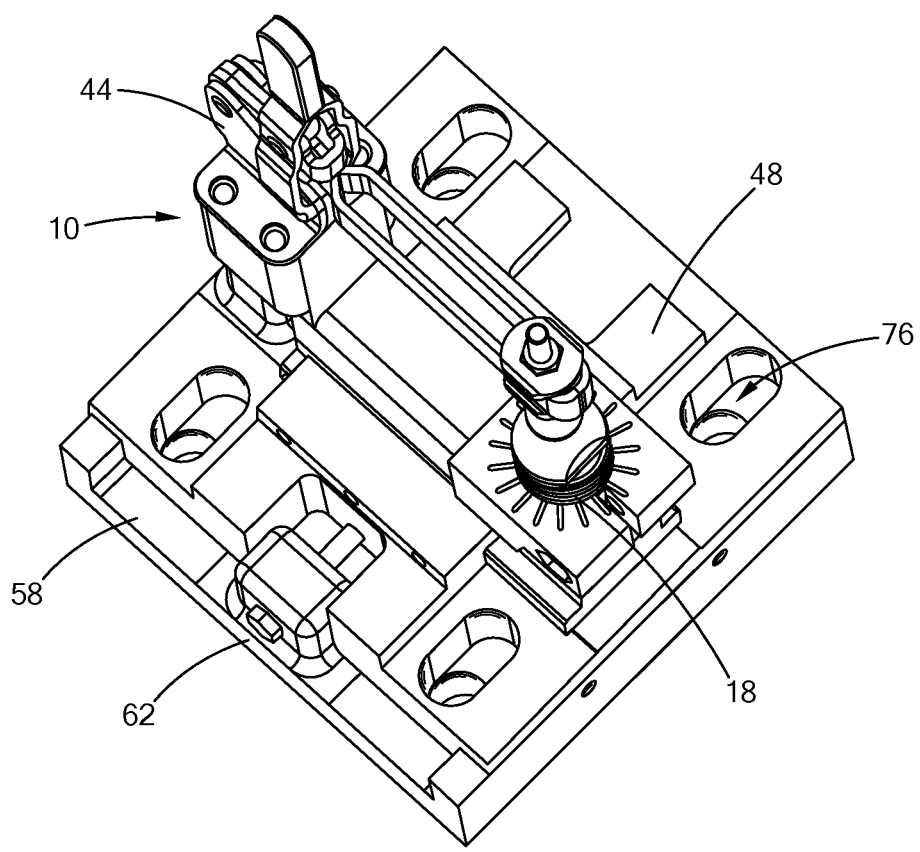
Figure 7:
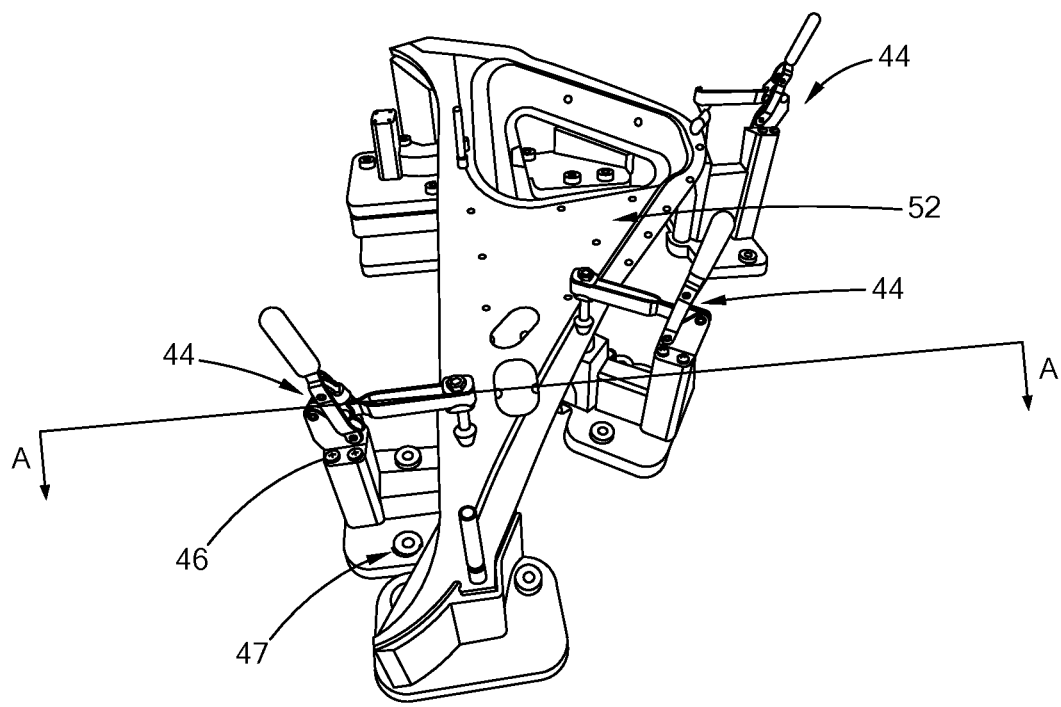
Figure 8:
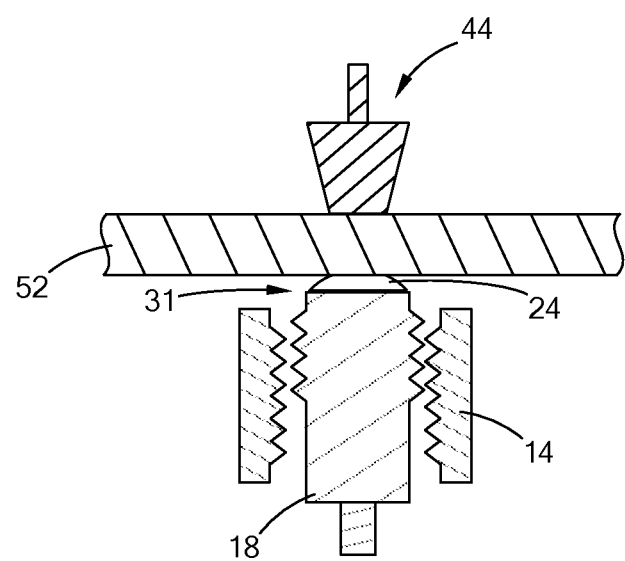
Figure 9:
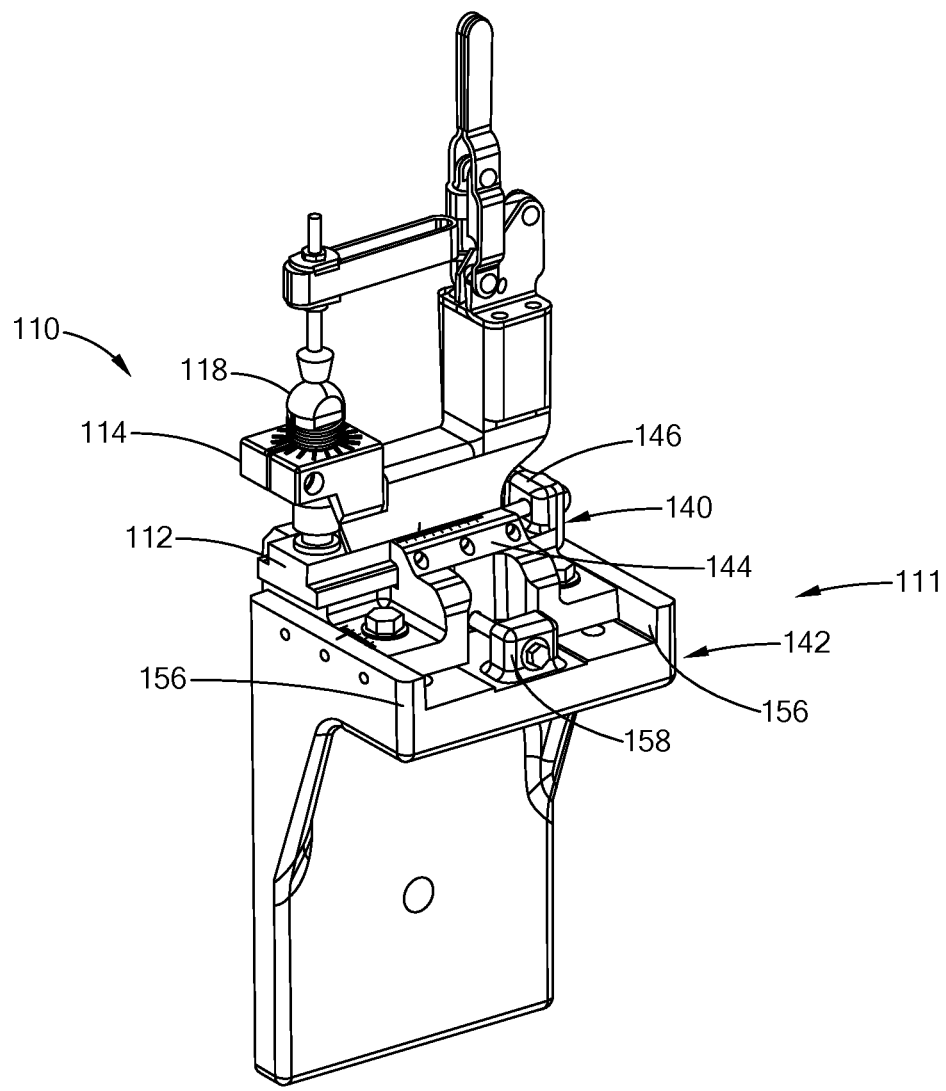
Figure 10:
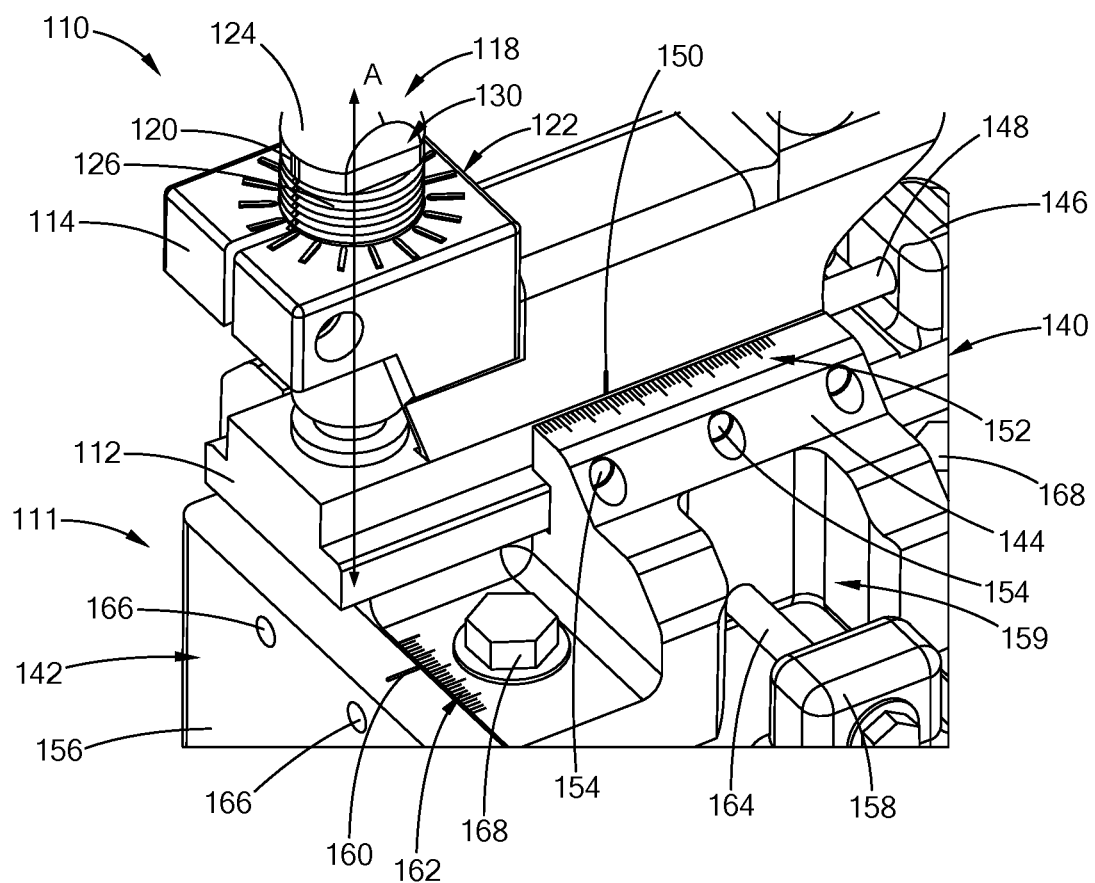

FIGS. 4a, 4b, and 4c are side cross-sectional views of the adjustable locating member as it is adjusted relative to the plurality of indicia, and the corresponding position indicator locations, according to the teachings of the present disclosure;

FIG. 5 is a perspective view of a locating fixture including a set of rails and constructed according to the teachings of the present disclosure;

FIG. 6 is elevation plan view of the top of the locating fixture of FIG. 5 according to the teachings of the present disclosure;

FIG. 7 is a perspective view of a plurality of locating fixtures locating a part according to the teachings of the present disclosure;

FIG. 8 is a cross-sectional view of a part being positioned between the adjustable locating member and a clamp according to the teachings of the present disclosure;

FIG. 9 is a front perspective view of another locating fixture and lower substructure constructed according to the teachings of the present disclosure;

FIG. 10 is an enlarged view of the locating fixture and lower substructure of FIG. 9;

FIG. 11 is a front perspective view of an adjustable locating member of the locating fixture of FIG. 9;

FIG. 12 is a front perspective view of another adjustable locating member according to the teachings of the present disclosure; and FIG. 13 is a front perspective view of yet another adjustable locating member according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
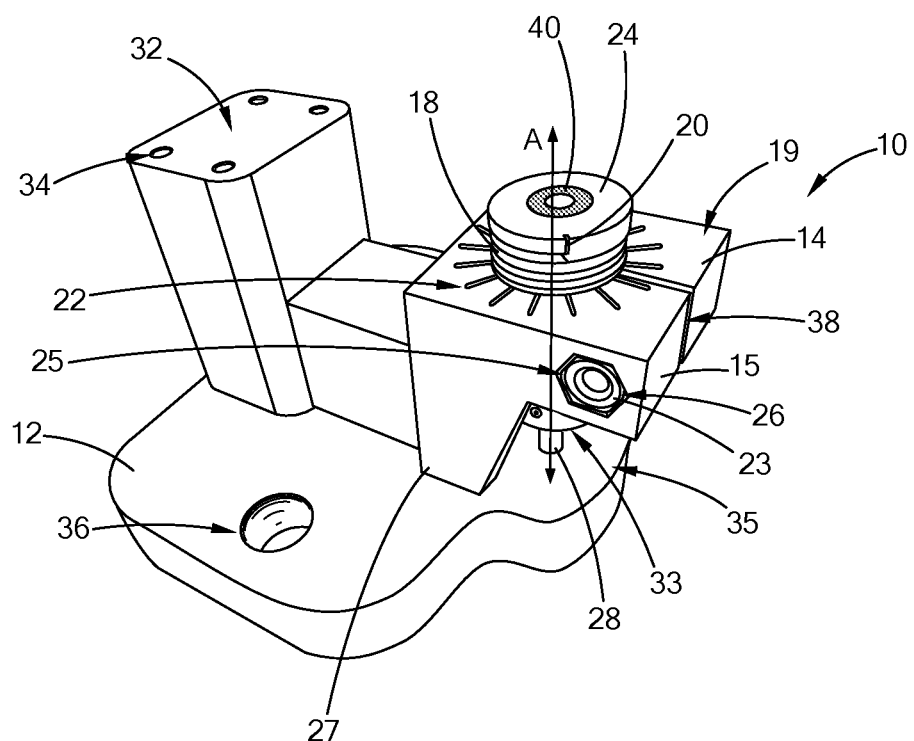
FIG. 1 is a front perspective view of a locating fixture constructed according to the teachings of the present disclosure.
Figure 2:
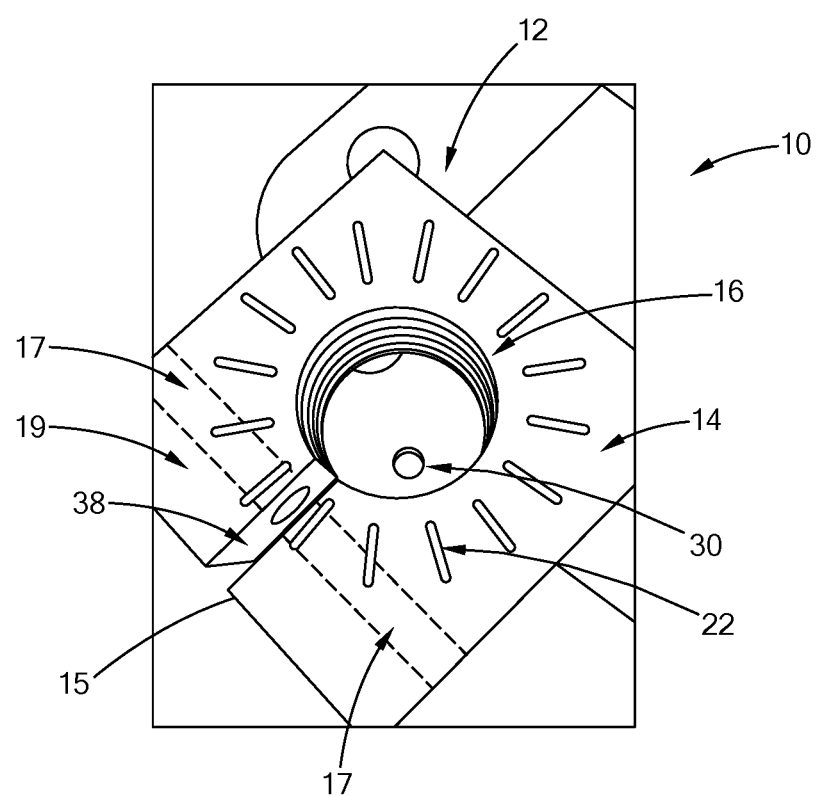
FIG. 2 is an elevational plan view of the top of the locating fixture of FIG. 1 according to the teachings of the present disclosure.
Figure 3:
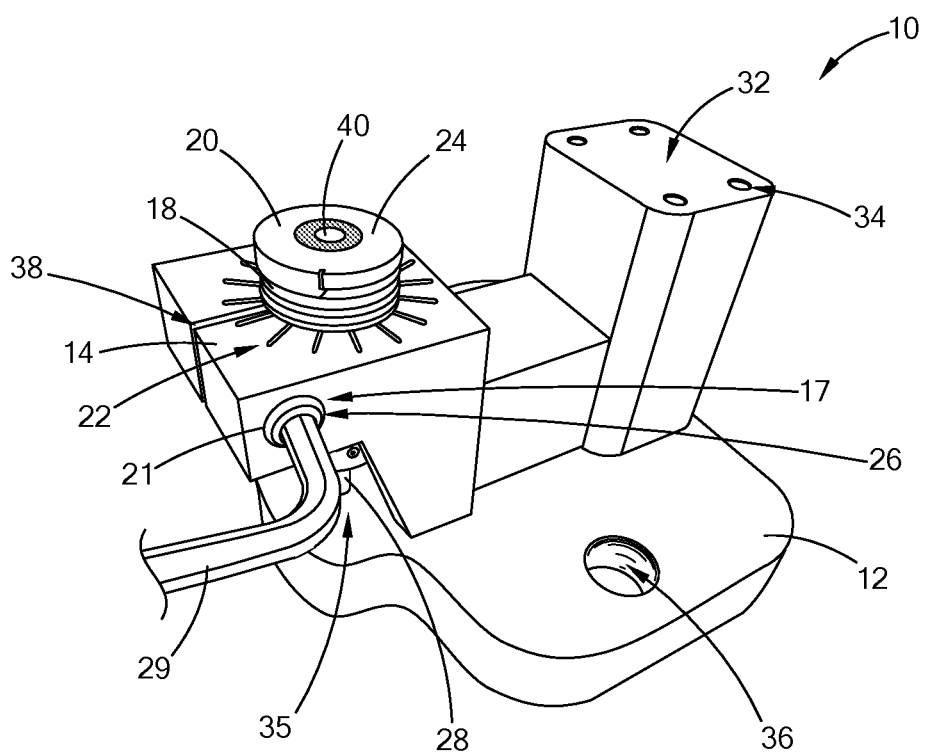
FIG. 3 is a rear perspective view of the locating fixture of FIG. 1 according to the teachings of the present disclosure.

As shown in FIGS. 1-3, a locating fixture 10 according to the teachings of the present disclosure includes a base 12 with a raised platform 14. The raised platform 14 includes a mounting aperture 16 to receive an adjustable locating member 18. The aperture 16 may be threaded to receive corresponding mating threads on the adjustable locating member 18, thereby allowing for rotational and translational adjustment of the adjustable locating member 18. The pitch of the threads for mounting the adjustable locating member 18 will dictate an amount of translational movement of the adjustable locating member 18, which in combination with an indicia as described in greater detail below, establishes an amount of adjustment of the adjustable locating member 18. Using a lower thread pitch (or higher thread count per inch) will result in a more precise adjustment of the translational position of the adjustable locating member 18. In one form, the pitch is between about 0.04 mm (0.016 in.) and about 0.06 mm (0.0024 in.). In another form, the pitch is about 0.05 mm. It should be understood that these values are merely exemplary and other thread pitches, among other translational means for the adjustable locating member 18, may be employed while remaining within the scope of the present disclosure. Further, the locating fixture 10 as illustrated herein with its overall geometry is merely one example of a locating fixture 10 designed for a specific part being positioned for measurement and the available space around such part. It should be understood that the locating fixture 10 may take on other geometries but yet still have the innovative adjustable locating member 18 and related features as described herein while remaining within the scope of the present disclosure.

As further shown, a position indicator 20 is located on the adjustable locating member 18 and cooperates with a plurality of indicia 22 located on the raised platform 14 to determine the vertical position along a longitudinal axis A of the adjustable locating member 18. In this form, the position indicator 20 is a notch, and the indicia 22 are raised bars having a contrasting color of black against the white background of the raised platform 14. It should be understood, however, that any type of position indicator and indicia, whether visual, audible, or having other haptic feedback may be employed while remaining within the scope of the present disclosure. Therefore, the notch and raised contrasting bars illustrated herein should not be construed as limiting the scope of the present disclosure.

As shown in FIGS. 4a-4c, as the adjustable locating member 18 is rotated, and thus moves longitudinally along axis A, the position indicator 20 aligns with different indicia 22 located on the raised platform 14. When the position indicator 20 aligns with a specific indicia 22, an operator knows the precise vertical position of the adjustable locating member 18, which is specified in a quality procedure/work instructions.

Referring back to FIGS. 1 to 3, the locating fixture 10 also has a restraining member in one form, which tightens the adjustable locating member 18 within the aperture 16 so that the adjustable locating member 18 does not move inadvertently during subsequent and repeated locating and measuring operations. In this form, the restraining member comprises a slotted opening 38 (best shown in FIG. 2) in the raised platform 14 extending from an outer edge 15 to the aperture 16. A through-hole 17 (FIG. 2) is also formed through a ledge portion 19 of the raised platform 14, which receives a bolt 21 and a nut 23, or a nut and bolt assembly 26, as shown. Additionally, a mating recess 25 is formed in a sidewall 27 of the raised platform 14 that matches a shape of the nut 23 (which in this form is a hexagonal shape), in order to lock the nut 23 in place while the bolt 21 is tightened with a tool 29, as shown in FIG. 3. As the bolt 21 is tightened, the slotted opening 38 closes and thus provides a clamping force to restrain the adjustable locating member 18. It should be understood, however, that other methods to restrain the adjustable locating member 18 within the aperture 16 from rotational and translational movement may also be employed, such as by way of example a set screw, while remaining within the scope of the present disclosure.

The adjustable locating member 18 also has a part locating feature 24 adjacent to a proximal end 31 (FIG. 8). As described in greater detail below, the part locating feature 24 is a contact point or surface, or a locating datum, for a part 52 (FIGS. 7 and 8) placed on the locating fixture 10 for measurement. The part locating feature 24 can be any geometry suitable for ensuring contact with the part 52 and may be flat, arcuate, or a point (for point contact), among other geometries.

As further shown in FIGS. 1 and 3, the base 12 includes a clamp mounting feature 32. The clamp mounting feature 32 in this form is located on base 12, allowing clamp 44 (FIGS. 6, 7 and 8) to be positioned and secure the part 52 opposite the part location feature 24 without deformation of the part 52. Mounting apertures 34 (FIG. 1), which receive threaded bolts or fasteners 46 (FIG. 7), are provided to mount the clamp 44 to the clamp mounting feature 32. It should be understood that this mounting arrangement is merely exemplary, and the clamp mounting feature 32 can be configured for any clamp 44 selected for use in restraining part 52 to the part locating feature 24. Similarly, the base 12 also may include apertures 36, which receive bolts or fasteners 47 (FIG. 7), for mounting to another platform as part of a larger assembly.

As further shown in FIGS. 1 and 3, the part locating feature 24 may include a target 40 used for teaching a coordinate measuring machine (CMM) or verifying location of the adjustable locating member 18.

The locating fixture 10 can be manufactured with traditional manufacturing such as machining, but additive manufacturing will provide for additional flexibility to adapt the locating fixture 10 to specific part 52 configurations. More specifically, additive manufacturing generally does not provide high-tolerance part geometries, but with the adjustability of the locating fixture 10, and more specifically the adjustable locating member 18 and position indicator 20, precise location of the adjustable locating member 18 can be provided, as well as throughout use of the locating fixture 10 without having to remanufacture any components to bring them within tolerance. The locating fixture 10 may be comprised of a mixture of additive manufactured parts and traditionally manufactured parts to create the locating fixture 10 with at least the adjustable locating member 18 and the raised platform 14 being manufactured with additive manufacturing.

Referring back to FIGS. 1, 3, and 4a in another form, the adjustable locating member 18 includes a stabilizing member 28 extending adjacent to a distal end 33 portion of the adjustable locating member 18. In this form, the stabilizing member 28 is an integral pin on the adjustable locating member 18 disposed within a recess 30 (best shown in FIG. 2) located in base 12. It should be understood that the stabilizing member 28 is not limited to a pin shape and may be any shape or type of stabilizing member while remaining within the scope of the present disclosure. It should be further understood the stabilizing member is not limited to being integrally formed as part of the adjustable locating member 18, but may be a separate part secured to the distal end 33. In one form, the stabilizing member 28 is free to rotate in the recess 30 when the adjustable locating member 18 translates up and down. The stabilizing member 28 is particularly beneficial to stabilize the adjustable locating member 18 when the adjustable locating member 18 is manufactured by an additive manufacturing process.

As further shown in FIGS. 1 and 3, the raised platform 14 is shown elevated above the base 12 such that the base 12 and the raised platform 14 define a cavity 35, or open space. Accordingly, the adjustable locating member 18 and stabilizing member 28 extend within the cavity 35 as shown. Further, the cavity 35 is sized to allow for placement of a dimensional gauge block (not shown) to assist in making macro-adjustments to the adjustable locating member 18.

Referring now to FIGS. 5 and 6, the locating fixture 10 is shown translatably mounted between a set of rails 48 on support member 58. The base 12 of locating fixture 10 is adjustable along the set of rails 48 in a longitudinal direction L1 using an adjustment feature 60 to control the movement. The adjustment feature 60 in this form is a screw driven system, however it should be understood that this adjustment feature is merely exemplary for adjustment of base 12 within the set of rails 48 and the adjustment feature could be another form such as a piston system without departing from the teachings of this disclosure. Once the desired location of base 12 is determined longitudinally along direction L1 within the set of rails 48, the base 12 is restricted from further movement with at least one securing element 56, which in this form is a set screw. There may be a plurality of securing elements 56 on one or more of the set of rails 48 to restrict the movement of base 12. In another variation, the locating fixture 10 is adjustable in the lateral direction L2 (FIG. 5). In this variation, locating fixture 10 is fixed between the set of rails 48 as described above. The lateral translation of the locating fixture 10 and the set of rails 48 along support member 58 is controlled by an adjustment feature 62. The adjustment feature 62 in this form is a screw driven system, however it should be understood that this adjustment feature is merely exemplary and the adjustment feature could be another form such as a piston system without departing from the teachings of this disclosure. Once the desired lateral location of the set of rails 48 and locating fixture 10 is achieved, aperture 76 (FIG. 6) located on the set of rails 48 in cooperation with fastener 74 (FIG. 5) provide for restraining the set of rails 48 at the desired position.

With reference to FIGS. 9-11, locating fixture 110 is shown translatably mounted to a lower substructure 111. The structure and function of the locating fixture 110 is generally similar or identical to that of the locating fixture 10 described above, apart from any exception noted below.

The locating fixture 110 includes a base 112 with a raised platform 114 and an adjustable locating member 118. The structure and function of the base 112 and the raised platform 114 may be similar or identical to that of the base 12 and raised platform 14, respectively, described above, and therefore, will not be described again in detail. The structure and function of the adjustable locating member 118 may be similar or identical to that of the locating member 118 described above, apart from any exception noted below. The adjustable locating member 118 is received in a mounting aperture of the raised platform 14.

The adjustable locating member 118 includes a part locating or upper portion 124, a threaded portion 126, and an end portion 128. In some forms, the adjustable locating member 118 may be made of a polymeric material, for example, and one or more portions of the adjustable locating member 118 may include a coating. In one example, the part locating portion 124 may include the coating. In another example, the part locating portion 124, the threaded portion 126, and the end portion 128 may all include the coating. The coating may comprise a Nickel (Ni) layer and/or a Copper (Cu) layer, for example. In this way, the adjustable locating member 118 may be heat resistant.

The part locating portion 124 is adjacent to a part (not shown) and has a tool removal feature 130. In the form illustrated, the tool removal feature 130 comprises opposed flat surfaces that allow a tool (not shown) to adjust or remove the adjustable locating member 118. In other forms, the tool removal feature 130 may be comprised of other shapes such as hexagonal, pentagonal, square or any other suitable shape that allows a tool (not shown) to adjust or remove the adjustable locating member 118. The part locating portion 124 includes a dome-shape that has a contact point for the part placed on the locating fixture 110 for measurement. In some variations, the part locating portion 124 can be any geometry suitable for providing contact with the part such as flat, arcuate, or a point (for point contact) among other geometries. The threaded portion 126 is positioned between the part locating portion 124 and the end portion 128 and includes external threads for mating with internal threads of the aperture of the raised platform 114, thereby allowing for rotational and translational adjustment of the adjustable locating member 118 (i.e., the adjustable locating member 118 may be adjustable in a vertical direction). The end portion 128 is disposed within a recess (not shown) located in the base 112. In one form, the end portion 128 is free to rotate in the recess when the adjustable locating member 118 translates up and down.

As further shown, a position indicator 120 is located on the adjustable locating member 118 and cooperates with a plurality of indicia 122 located on the raised platform 114 to determine the vertical position along a longitudinal axis A of the adjustable locating member 118.

The lower substructure 111 is configured to allow for longitudinal and lateral translation of the base 112. Stated differently, the base is translatably mounted to the lower substructure 111. The lower substructure 111 may be manufactured with an additive manufacturing process, for example, and comprises an upper plate 140 and a lower plate 142. The upper plate 140 is slidably engaged with the lower plate 142 and comprises a set of rails 144 and a protrusion 146. The base 112 is translatably mounted between the set of rails 144. Each rail 144 (only one shown in FIGS. 9 and 10) includes a slot that a respective protrusion of the base 112 slidably engages. A base position indicator 150 is fixed to the base and at least one scale 152 is located between the base 112 and the upper plate 140 (e.g., located on a respective rail 144). The base position indicator 150 cooperates with the scale 152 to indicate a translational position of the base 112 relative to the upper plate 140. A base displacement member 148 is secured to the protrusion 146 of the upper plate 140 (e.g., extends through the protrusion 146) and is operable to engage a lower portion of the base 112 to translate the base 112 between the set of rails 144 of the upper plate 140. In the form illustrated, the base displacement member 148 is a threaded screw. In other forms, the base displacement member 148 could be a piston system used to translate the base 112 between the set of rails 144. Once the desired location of the base 112 is determined within the set of rails 144, the base 112 may be restricted from further movement with one or more securing elements 154 associated with each rail 144 of the set of rails 144 (e.g., disposed within each rail 144 of the set of rails 144). In one example, the securing elements 154 may be set screws.

The lower plate 142 comprises a set of rails 156 and a protrusion 158. The upper plate 140 is translatably mounted to the lower plate 142 between the set of rails 156 of the lower plate 142. The protrusion 158 is located between the set of rails 156. The upper plate 140 comprises a cutout 159 slidably engaged about the protrusion 158. In some forms, the protrusion 158 may act as a stop to limit translational movement of the upper plate 140 relative to the lower plate 142.

A plate position indicator 160 is fixed to a respective rail 156 of the lower plate 142 and at least one scale 162 is located between the lower plate 142 and the upper plate 140 (e.g., located on the lower plate 142). The plate position indicator 160 cooperates with the scale 162 to indicate a translational position of the upper plate 140 relative to the lower plate 142. An upper plate displacement member 164 is secured to the protrusion 158 of the lower plate 142 (e.g., extends through the protrusion 158) and is operable to engage the upper plate 140 to translate the upper plate 140 between the set of rails 156 of the lower plate 142. In the form illustrated, the upper plate displacement member 164 is a threaded screw. In other forms, the upper plate displacement member 164 could be a piston system used to translate the upper plate 140 between the set of rails 156. Once the desired location of the upper plate 140 is determined within the set of rails 156, the upper plate 140 may be restricted from further movement with one or more securing elements 166 associated with each rail 156 of the set of rails 156 (e.g., disposed within each rail 156 of the set of rails 156). In one example, the securing elements 166 may be set screws. Additionally, once the desired location of the upper plate 140 is determined within the set of rails 156, fasteners 168 such as bolts or screws, for example, may extend through apertures of the upper plate 140 and slots of the lower plate 142 to further restrict movement of the upper plate 140 (i.e., secure the upper plate 140 to the lower plate 142).

With reference to FIG. 12, adjustable locating member 218 is illustrated. The adjustable locating member 218 may be incorporated into locating fixture 110 described above instead of adjustable locating member 118. The structure and function of the adjustable locating member 218 may be similar or identical to that of the adjustable locating member 118 described above, apart from any exception noted below.

The adjustable locating member 218 includes a part locating or upper portion 224, a threaded portion 226, and an end portion 228. The part locating portion 224 is adjacent to a part (not shown). The part locating portion 224 includes a flat upper surface 240 configured to support the part placed on the locating fixture 110.

With reference to FIG. 13, adjustable locating member 318 is illustrated. The adjustable locating member 318 may be incorporated into locating fixture 110 described above instead of adjustable locating members 118, 218. The structure and function of the adjustable locating member 318 may be similar or identical to that of adjustable locating members 118, 218 described above, apart from any exception noted below.

The adjustable locating member 318 includes a part locating or upper portion 324, a threaded portion 326, and an end portion 328. The part locating portion 324 is adjacent to a part (not shown). The part locating portion 324 includes a flat upper surface 340. A central aperture or bore 342 may be formed in the part locating portion 324. In other forms, the bore 342 may extend through other portions of the adjustable locating member 318 (e.g., the bore 342 may extend through the threaded portion 326 and the end portion 328 in addition to the part locating portion 324). The bore 342 is configured to receive a locating pin (not shown), which facilitates positioning of a part (not shown) on the locating fixture 110.

The description of the disclosure is merely exemplary in nature and, thus, variations that do not depart from the substance of the disclosure are intended to be within the scope of the disclosure. Such variations are not to be regarded as a departure from the spirit and scope of the disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The description of the disclosure is merely exemplary in nature and, thus, variations that do not depart from the substance of the disclosure are intended to be within the scope of the disclosure. Such variations are not to be regarded as a departure from the spirit and scope of the disclosure.

As used herein, the phrase at least one of A, B, and C should be construed to mean a logical (A OR B OR C), using a non-exclusive logical OR, and should not be construed to mean "at least one of A, at least one of B, and at least one of C.

What is claimed is:

1. A locating fixture comprising:
   a base including a raised platform having a mounting aperture;
   an adjustable locating member disposed within the mounting aperture and including a part locating feature and a position indicator fixedly attached to the adjustable locating member;
   a plurality of indicia located on the raised platform adjacent to the adjustable locating member, wherein the position indicator cooperates with the plurality of indicia to determine a vertical position of the adjustable locating member;
   a restraining member cooperatively engaged with the adjustable locating member; and
   a lower substructure configured to allow for longitudinal and lateral translation of the base,
   wherein the base is translatably mounted to the lower substructure.

2. The locating fixture according to claim 1, wherein the lower substructure comprises an upper plate slidably engaged with a lower plate, the upper plate comprising a set of rails and the base being translatably mounted between the set of rails.

3. The locating fixture according to claim 2, wherein the lower plate comprises a protrusion and the upper plate comprises a cutout slidably engaged about the protrusion.

4. The locating fixture according to claim 2, wherein the lower plate comprises a set of rails and the upper plate is translatably mounted to the lower plate between the set of rails of the lower plate.

5. The locating fixture according to claim 2, further comprising a base displacement member secured to the upper plate and operable to engage a lower portion of the base to translate the base between the set of rails of the upper member.

6. The locating fixture according to claim 5, wherein the base displacement member is a threaded screw.

7. The locating fixture according to claim 2, further comprising an upper plate displacement member secured to the lower plate and operable to engage the upper plate to translate the upper plate.

8. The locating fixture according to claim 7, wherein the upper plate displacement member is a threaded screw.

9. The locating fixture according to claim 1, wherein at least one of the base, the raised platform, the adjustable locating member, and the lower substructure are manufactured with an additive manufacturing process.

10. The locating fixture according to claim 1, wherein the adjustable locating member is a polymeric material and at least an upper portion of the adjustable locating member comprises a coating.

11. The locating fixture according to claim 10, wherein the coating comprises a Nickel (Ni) layer and a Copper (Cu) layer.

12. The locating fixture according to claim 1, further comprising a base position indicator fixed to the base and at least one scale between the base and an upper plate of the lower substructure, and wherein the base position indicator cooperates with the at least one scale to indicate a translational position of the base relative to the upper plate.

13. The locating fixture according to claim 1, wherein:
    the lower substructure comprises an upper plate slidably engaged with a lower plate;
    a plate position indicator fixed to one of the upper plate and the lower plate; and
    at least one scale between the lower plate and the upper plate, the plate position indicator cooperates with the at least one scale to indicate a translational position of the upper plate relative to the lower plate.

14. The locating fixture according to claim 1, wherein an upper portion of the adjustable locating member comprises a domed shape.

15. The locating fixture according to claim 1, wherein an upper portion of the adjustable locating member comprises a central aperture configured to receive a locator pin.

16. The locating fixture according to claim 1, wherein an upper portion of the adjustable locating member comprises a flat top.

17. The locating fixture according to claim 1, wherein an upper portion of the adjustable locating member comprises a tool removal feature.

18. A locating fixture comprising:
    a base including a raised platform having a mounting aperture;
    an adjustable locating member disposed within the mounting aperture and including a part locating feature and a position indicator fixedly attached to the adjustable locating member;

a plurality of indicia located on the raised platform adjacent to the adjustable locating member, wherein the position indicator cooperates with the plurality of indicia to determine a vertical position of the adjustable locating member;

a restraining member cooperatively engaged with the adjustable locating member; and a lower substructure configured to allow for longitudinal and lateral translation of the base, wherein the base is translatably mounted to the lower substructure and wherein at least one of the base, the raised platform, the adjustable locating member, and the lower substructure are manufactured with an additive manufacturing process.

19. The locating fixture according to claim 18, wherein the lower substructure comprises an upper plate slidably engaged with a lower plate, the upper plate comprising a set of rails and the base being translatably mounted between the set of rails.

20. A locating fixture comprising:

a base including a raised platform having a mounting aperture;

an adjustable locating member disposed within the mounting aperture and including a part locating feature and a position indicator fixedly attached to the adjustable locating member;

a plurality of indicia located on the raised platform adjacent to the adjustable locating member, wherein the position indicator cooperates with the plurality of indicia to determine a vertical position of the adjustable locating member; and a lower substructure configured to allow for longitudinal and lateral translation of the base, the lower substructure comprising an upper plate slidably engaged with a lower plate, the upper plate comprising a set of rails and the base being translatably mounted between the set of rails, wherein the base is translatably mounted to the lower substructure.

* * * * *